United States Patent
Ochiai

(10) Patent No.: US 6,648,258 B2
(45) Date of Patent: Nov. 18, 2003

(54) SPINNING REEL SPOOL AND SPINNING REEL

(75) Inventor: Kouji Ochiai, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/978,085

(22) Filed: Oct. 17, 2001

(65) Prior Publication Data

US 2002/0053618 A1 May 9, 2002

(30) Foreign Application Priority Data

Oct. 25, 2000 (JP) ........................................ 2000-325356
Oct. 25, 2000 (JP) ........................................ 2000-325358
Jun. 6, 2001 (JP) ........................................ 2001-170922

(51) Int. Cl.$^7$ .............................................. A01K 89/15
(52) U.S. Cl. ........................................ 242/323; 242/322
(58) Field of Search ................................ 242/322, 323, 242/319; 24/115 F

(56) References Cited

U.S. PATENT DOCUMENTS

| 5,333,813 A | * | 8/1994 | Hirano | 242/322 |
| 5,372,325 A | * | 12/1994 | Uehara et al. | 242/322 |
| 5,615,841 A | * | 4/1997 | Saito | 242/231 |
| 2001/0002684 A1 | * | 6/2001 | Hitomi et al. | 242/322 |

FOREIGN PATENT DOCUMENTS

| FR | 0 164 295 A1 | 12/1985 | |
| FR | 2 763 478 A1 | 11/1998 | |
| JP | 2001-103880 A | 4/2001 | |
| JP | 2001103880 A | * 4/2001 | .......... A01K/89/01 |
| JP | 2001-103883 A | 4/2001 | |
| JP | 2001-269094 A | 10/2001 | |

* cited by examiner

*Primary Examiner*—Kathy Matecki
*Assistant Examiner*—Evan Langdon
(74) *Attorney, Agent, or Firm*—Sinjyu Global IP Counselors, LLP

(57) ABSTRACT

A spinning reel spool for more conveniently for locking and unlocking the mid-part of fishing line is provided. The spinning-reel spool has a spool body and a large-diameter tubular skirt. The spool body includes on an outer circumference a tubular bobbin trunk onto which fishing line is wound. The larger-diameter tubular skirt is formed integrally with the bobbin trunk on its rear. A fishing-line lock is provided on the outer periphery of the skirt. The fishing-line lock locks fishing-line. The locked fishing line is released under tension acting over a line roller when the fishing line is reeled out. The fishing-line lock includes a lock portion provided outwardly exposed and facing out on the skirt outer periphery, and a mount portion that extends into the skirt interior. The lock portion is configured to be approximately hemispherical or tetra-spherical in contour. The lock portion is formed so that the length A of the lock portion in the front-to-rear direction is shorter than the length B of the lock portion in the circumferential direction.

19 Claims, 11 Drawing Sheets

SPINNING REEL SPOOL AND SPINNING REEL

BACKGROUND OF THE INVENTION

1. Field of the Invention

The present invention relates to spinning reel spools. More specifically, the present invention relates to spinning reel spools having fishing-line locks for locking the fishing line and relates to spinning reels that attach to a fishing rod and enable fishing line to be reeled out and retrieved.

2. Background Information

Spinning reels are in general furnished with a reel body, a rotor and a spool. The reel body rotatively supports a handle. The spool moves reciprocatingly with respect to the reel body. The spool includes a bobbin trunk, a larger diameter flange, and a skirt. Fishing line is wound onto the bobbin trunk. Hereinafter, the front is defined as a side opposite the reel body and the rear as the side toward the reel body. The larger-diameter flange is disposed on a front end of the bobbin trunk. The skirt is formed integrally with the bobbin trunk on the rear. A fishing-line lock for locking the fishing line wound onto the bobbin trunk can be provided on the skirt.

Conventional fishing-line locks lock the leading-end part of the fishing line wound onto the bobbin trunk. The locks keep the fishing line from coming loose from the bobbin trunk. This type of fishing-line lock includes a lock portion made, e.g., of a synthetic resin, and a plate-shaped mounting portion formed integrally with the lock portion. The lock portion is for example exposed along the outer circumferential surface of the skirt, arranged to part at a slight gap from the skirt and to have a rearward opening.

To employ the fishing-line lock to lock a fishing line, an angler lifts on the lock portion to spread the opening, and locks the leading end of the fishing line by nipping it in the gap between the lock portion and the skirt. In this case, the lock portion is formed of synthetic resin. Thus, owing to the elasticity of the synthetic resin, the locked fishing line will not readily come undone. Therefore, to undo the locked fishing line, the angler lifts on the lock portion and releases the locked fishing line by tugging on the line in a direction opposite the direction in which the fishing line is locked.

Angling techniques with spools like this include setting the length of a cast by locking the mid-part of the line. In this case, the part of the fishing line that is to become the end of the desired cast length is engaged into the lock portion, and the remaining fishing line is wound. Then the bail is opened and a cast made. Since the mid-part of the fishing line is locked, the fishing line reels out to just the desired cast length. On the other hand, when a catch is made, a large tension on the fishing line engaged in the lock portion is produced. The fishing line ideally would automatically disengage from the lock portion under the tension acting over a line roller when the fishing line reels out. However, conventional fishing-line locks do not have an automatic release feature. Thus, the angler has to disengage manually the fishing line. In performing the angling technique in which the mid-part of the fishing line is locked, the fishing line therefore will not automatically disengage under tension, which is inconvenient.

In view of the above, there exists a need for spinning reel which overcomes the above mentioned problems in the prior art. This invention addresses this need in the prior art as well as other needs, which will become apparent to those skilled in the art from this disclosure.

SUMMARY OF THE INVENTION

An object of the present invention is to provide a spool with an easy to use locking mechanism for locking and unlocking a mid-part of the fishing line.

A first aspect of the present invention provides a spinning-reel spool that moves reciprocatingly with respect to a reel body, and onto which a line roller fishing line is wound by a rotor rotation. The spool has a bobbin trunk portion, a skirt portion, and a fishing-line lock. The bobbin trunk portion is located on an outer circumference of the spool. Fishing line is wound onto the bobbin trunk portion. The skirt portion is provided on the bobbin trunk at its rear end. The fishing-line lock is located on the outer periphery of the skirt portion. The fishing-lock locks the fishing line, and releases the fishing line under tension acting over the line roller when the fishing line is reeled out.

A fishing-line lock that locks, for example, the mid-part of the fishing line is provided on a spool as follows. The fishing-line lock is configured so that when the mid-part of the fishing line is locked, large tension acting over the line roller when the fishing line is reeled out readily releases the fishing-line locked in the fishing-line lock. The fishing line is thus released automatically under the tension that acts over the line roller when the fishing line is reeled out. Thus, the spool more conveniently enables the mid-part of the fishing line to be locked and released.

A second aspect of the present invention provides a spool as set forth in the first aspect, wherein the fishing-line lock is formed to be shorter in length longitudinally than circumferentially. In this case, the fact that the locking portion for the fishing-line is short means that fishing line engaged in the fishing-line lock comes undone easily under tension.

A third aspect of the present invention provides a spool as set forth in the first or second aspect, wherein the forward end of the fishing-line lock is formed in an approximately round arcuate shape. In this case, since the forward end of the fishing-line lock is formed in an approximately round arcuate shape such as approximately hemispherical or tetra-spherical, the fishing-line locked in the fishing-line lock disengages easily.

A fourth aspect of the present invention provides a spool as set forth in the first aspect, further including a fishing-line entry blocker for preventing the fishing line from entering the fishing-line lock. In this case, providing a fishing-line entry blocker, e.g., opposing the fishing-line lock, keeps slackened fishing line from entering the fishing-line lock. Thus, slackened fishing line is not liable to get tangled in the fishing-line lock.

A fifth aspect of the present invention provides a spool as set forth in the fourth aspect, wherein the fishing-line entry blocker is provided rearward of the fishing-line lock.

A sixth aspect of the present invention provides a spool as set forth in the fourth aspect, wherein the fishing-line entry blocker projects outward more radially than the fishing-line lock.

A spool in terms of a seventh aspect of the present invention provides a spool as set forth in the fourth aspect, wherein the fishing-line entry blocker is formed integrally with the skirt.

An eighth aspect of the present invention provides a spool as set forth in the fourth aspect, wherein the fishing-line entry blocker is formed as a separate entity from the skirt.

A ninth aspect of the present invention provides a spool as set forth in the fourth aspect, wherein the fishing-line entry blocker includes a step portion opposing the fishing-line lock.

A tenth aspect of the present invention provides a spool as set forth in the fourth aspect, wherein the fishing-line entry blocker is a plate-shaped component.

An eleventh aspect of the present invention provides a spool as set forth in the tenth aspect, wherein the fishing-line entry blocker shifts with respect to the skirt.

A twelfth aspect of the present invention provides a spool as set forth in the eleventh aspect, wherein the fishing-line entry blocker can be outer radially flush with the skirt, or housed to position the fishing-line entry blocker inner-marginally from the outer circumferential surface.

A thirteenth aspect of the present invention provides a spool as set forth in the first aspect, further including an auxiliary fishing-line lock on the outer circumference of the skirt portion for locking the leading end part of the fishing line. In this case, two types of fishing-line locks are provided, an auxiliary fishing-line lock and a fishing line lock that locks the mid-part of the fishing line. The auxiliary fishing-line lock conventionally locks the leading-end part of the fishing line. The fishing-line lock locks the mid-part of the fishing line, and in which, for example, a fishing-line entry blocker functions.

A fourteenth aspect of the present invention provides a spool as set forth in the thirteenth aspect, wherein the fishing-line lock is formed so that the locking force of the fishing-line lock is weaker than the locking force of the auxiliary fishing-line lock. In this case, against the comparatively strong locking force with which the auxiliary fishing-line lock engages the leading-end part of the fishing line, the locking force with which the fishing-line lock engages the mid-part of the fishing line is weaker than the locking force of the auxiliary fishing-line lock. Thus, fishing-line locked in the fishing-line lock comes undone more readily than fishing-line locked in the auxiliary fishing-line lock.

A fifteenth aspect of the present invention provides a spinning reel that attaches to a fishing rod and enables fishing line to be reeled out and retrieved. The reel includes a reel body, a spool, a rotor, a fishing-line lock, and a protrusion. The reel body attaches to the fishing rod. The spool has a bobbin trunk that moves with respect to the reel body. Fishing line winds onto another circumference of the bobbin trunk. The skirt is provided on the rear end of the bobbin trunk. The rotor is rotatively attached to the reel body to rotate relative to the spool when the fishing line is reeled out. A rotor arm is disposed about the outer circumference of the spool and a bail arm. The bail arm is mounted on the rotor arm and provided with a line roller for guiding the fishing line and for winding the fishing line onto the bobbin trunk. The fishing-line lock is located on the outer periphery of the skirt portion for locking the fishing line, and for releasing the fishing line under tension acting over the line roller when the fishing line is reeled out. The protrusion is disposed between the line roller and the fishing-line lock.

With this spinning reel, a fishing-line lock that locks, for example, the mid-part of the fishing line is provided on a spool as follows. The fishing-line lock is configured so that when the mid-part of the fishing line is locked, large tension acting over the line roller when the fishing line is reeled out readily releases the fishing-line locked in the fishing-line lock. The fishing line is thus released automatically under the tension that acts over the line roller when the fishing line is reeled out. Thus, the spinning reel is the more convenient to use because it enables the mid-part of the fishing line to be locked and released.

A sixteenth aspect of the present invention provides a spinning reel as set forth in the fifteenth aspect, further including a protrusion disposed between the line roller and the fishing-line lock. The protrusion protrudes on the rotor so as to catch the fishing line when the fishing line reels out over the line roller.

In this case, the mid-part of the fishing line, for example, is engaged by the fishing-line lock. Then, with the mid-part of the fishing-line locked in the fishing-line lock, large tension acting over the line roller when the fishing line is reeled out will undo the fishing line from the fishing-line lock. Since the reeling-out fishing line during this time is hooked in the protrusion formed on the rotor, the angle the fishing line assumes is not liable to become an acute angle. Thus, the fishing-line automatically disengages from the fishing-line lock under tension acting on the reeling-out fishing line.

Herein, when the angling technique of locking the mid-part of the fishing line is performed, the fishing line can readily disengage from the lock, which is the more convenient.

A seventeenth aspect of the present invention provides a spinning reel as set forth in the sixteenth aspect, wherein the protrusion is provided on the rotor arm. In this case, in particular, the case in which the rotor arm is located more toward the spool than the bail arm, the protrusion being provided between the line roller on the line-roller-side rotor arm, and the fishing-line lock, assists in releasing the engagement of fishing-line locked in the fishing-line lock.

An eighteenth aspect of the present invention provides a spinning reel as set forth in the sixteenth aspect, wherein the protrusion is provided on the bail arm. In this case, in particular, the case in which the bail arm is positioned more toward the spool than the rotor arm, by providing the protrusion being between the line roller on the line-roller-side bail arm, and the fishing-line lock, the protrusion can assist in releasing the engagement of fishing-line locked in the fishing-line lock.

A nineteenth aspect of the present invention provides a spinning reel as set forth in the sixteenth aspect, wherein the spool rotates when the fishing line reels out over the line roller.

A twentieth aspect of the present invention provides a spinning reel as set forth in the sixteenth aspect, wherein the rotor rotates when the fishing line reels out over the line roller.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
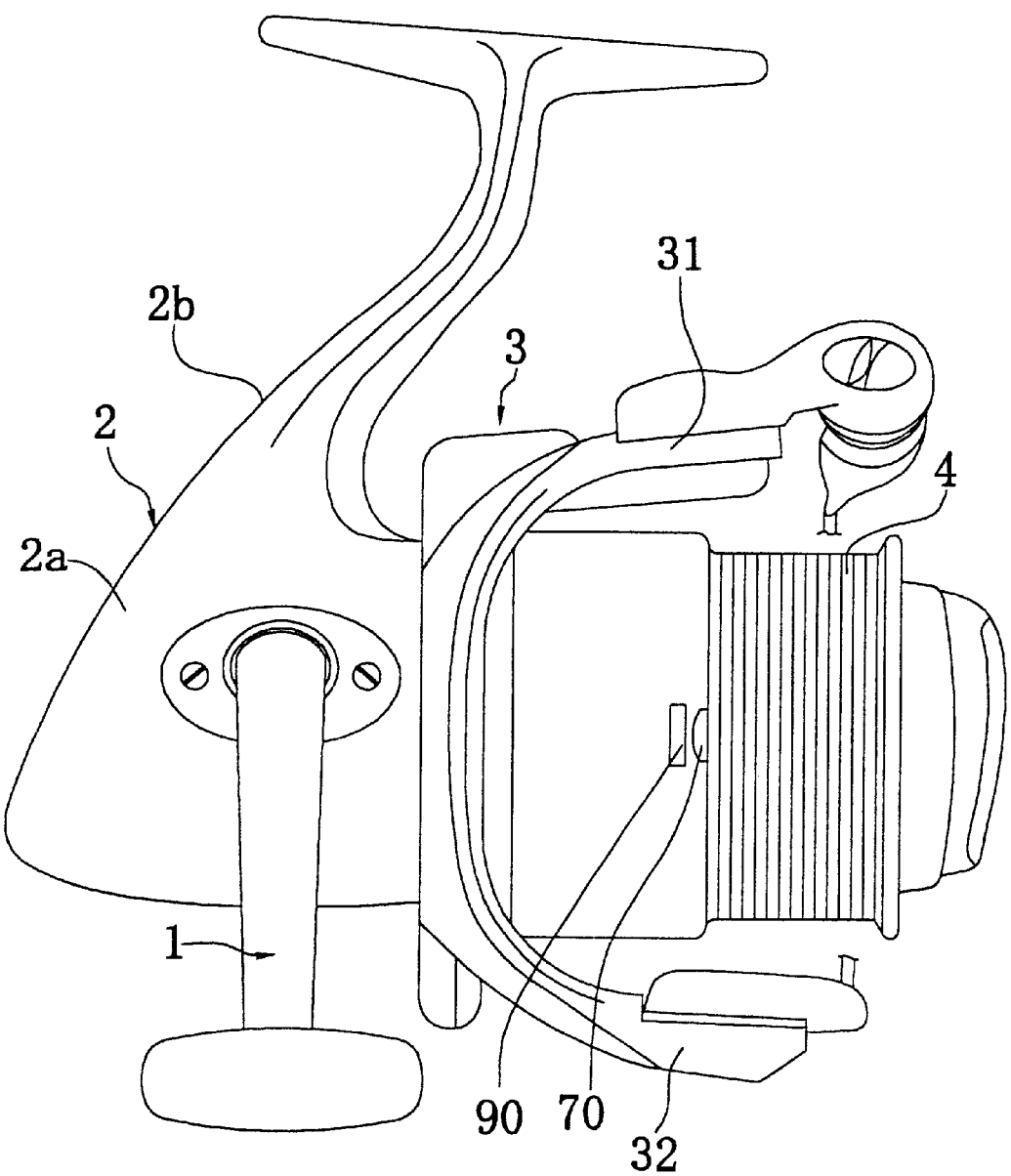
FIG. 1 is an elevational view of a spinning reel in accordance with an embodiment of the present invention.

A spinning reel in accordance with an embodiment of the present invention, as shown in FIG. 1, includes a reel unit 2 in which a handle 1 is rotatively attached, a rotor 3, and a spool 4. The rotor 3 is rotatively attached on the front of the reel unit 2. The spool 4, onto whose outer circumference fishing line is wound, is disposed on the front of the rotor 3, where it moves reciprocatingly.

Figure 2:
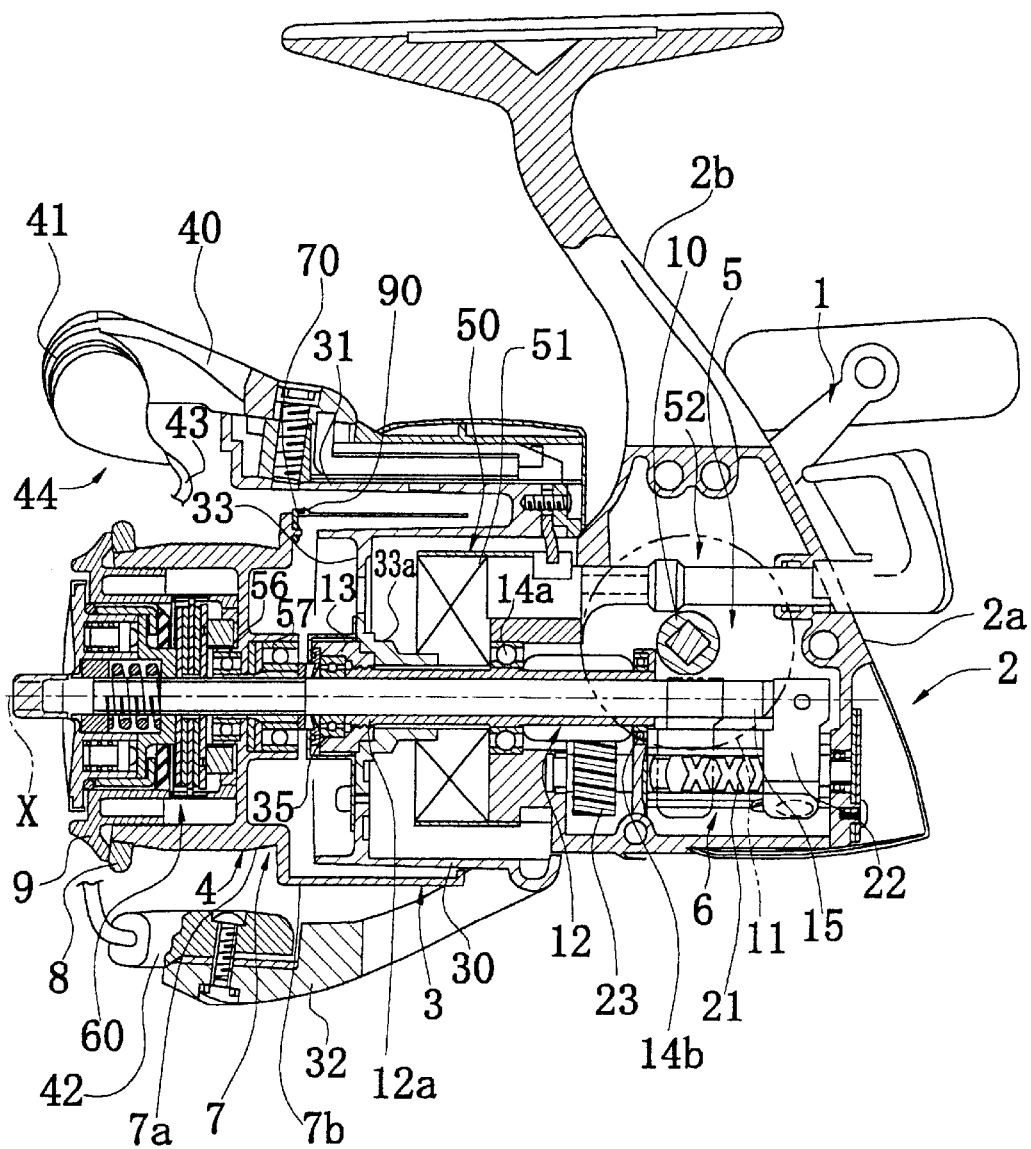
FIG. 2 is a cross-sectional elevational view of the opposite side of the spinning reel of FIG. 1.

The reel unit 2 includes a reel body 2a, and a rod-mounting leg 2b that extends diagonally up/forward from the reel body 2a. The reel body 2a, as shown in FIG. 2, has an interior space. A rotor driving mechanism 5 and an oscillating mechanism 6 are provided within the space. The rotor driving mechanism 5 is rotated in cooperation with the rotation of the handle 1. The oscillating mechanism 6 winds fishing line uniformly onto the spool 4 by pumping the spool 4 back and forth.

The rotor drive mechanism 5 has a face gear 11 that rotates together with a handle shaft 10 to which the handle 1 is fixed. Further, the rotor drive mechanism 5 has a pinion gear that meshes with the face gear 11. The pinion gear 12 is tabularly formed, and its front 12a penetrates the center of the rotor 3. The pinion gear 12 is fixed to the rotor 3 by a nut 13. Further, the pinion gear 12 is supported rotatively at its mid-portion and rear-end, in the axial direction, via respective bearings 14a, 14b.

The oscillating mechanism 6 is a device that causes a spool shaft 15, coupled via a drag mechanism 60 to the spool 4 through its center, to reciprocate, which pumps the spool 4 in the same direction. The oscillating mechanism 6 has a worm shaft 21, a slider 22, and an intermediate gear 23. The worm shaft 21 is disposed below and parallel to the spool shaft 15. The slider 22 travels back and forth along the worm shaft 21. The intermediate gear 23 is fixed to the fore end of the worm shaft 21. The hind end of the spool shaft 15 is fixed non-rotatably to the slider 22. The intermediate gear 23 meshes with the pinion gear 12.

The rotor 3, as shown in FIG. 2, includes a cylindrical portion 30, and first and second rotor arms 31, 32. The first and second rotor arms 31, 32 oppose each other sideways on the cylindrical portion 30. The cylindrical portion 30 and the two rotor arms 31, 32 are formed unitarily and manufactured of, e.g., aluminum alloy.

A fore wall 33 is formed on the front of the cylindrical portion 30, and a boss 33a is shaped in the central portion of the fore wall 33. A through-hole is formed in the center of the boss 33a. The front 12a of the pinion gear 12, as well as the spool shaft 15, penetrates the through-hole. The nut 13 is disposed in the front of the fore wall 33, and a bearing 35 that rotatively carries the spool shaft 15 is disposed within the nut 13.

A first bail-support member 40 is pivotally mounted on the outer peripheral side of the lead end of the first rotor arm 31. A line roller 41 for guiding fishing line onto the spool 4 is mounted on the tip of the first bail-support member 40. A second bail-support member 42 is pivotally mounted on the lead end inner peripheral side of the of the second rotor arm 32.

A bail 43, whose conformation is preferably a wire bent into an approximate U-shape, is fixed between the liner roller 41 and the second bail-support member 42. The first and second bail-support members 40, 42, the line roller 41, and the bail 43 are parts of a bail arm 44 that guides fishing line onto the spool 4. The bail arm 44 pivots between a line-guiding posture, shown in FIG. 2, and a line-releasing posture.

An anti-reverse mechanism 50 for prohibiting/releasing reversal of the rotor 3 is disposed within the cylindrical portion 30 of the rotor 3. The anti-reverse mechanism 50 includes, as shown in FIG. 2, a roller-type one-way clutch 51 whose inner race is free-rotating, and a switching device 52 for switching the one-way clutch between an operational state (reverse-prohibited state) and a non-operational state (reverse-permitted state).

The spool 4 is disposed between the first rotor arm 31 and the second rotor arm 32 on the rotor 3. The spool 4 is mounted, via the drag mechanism 60, on the fore end of the spool shaft 15. The spool 4 includes a spool body 7, a larger-diameter flange 8, and a flange-fastening member. The spool body 7 has a tubular bobbin trunk 7a onto whose outer circumference fishing line is wound. The spool body 7 also has a larger-diameter tubular skirt 7b formed integrally with and on the rear of the bobbin trunk 7a. The larger-diameter flange 8 is fitted onto the front end of the bobbin trunk 7a. The flange-fastening member fastens the flange 8 to the spool body 7.

The spool body is a dual-stage cylindrical component with at least two different sized radii. The spool body 7 is obtained by, e.g., stamp-forging aluminum alloy. The spool body 7 is mounted on the spool shaft 15, where it rotates by way of two bearings 56, 57.

Figure 3:
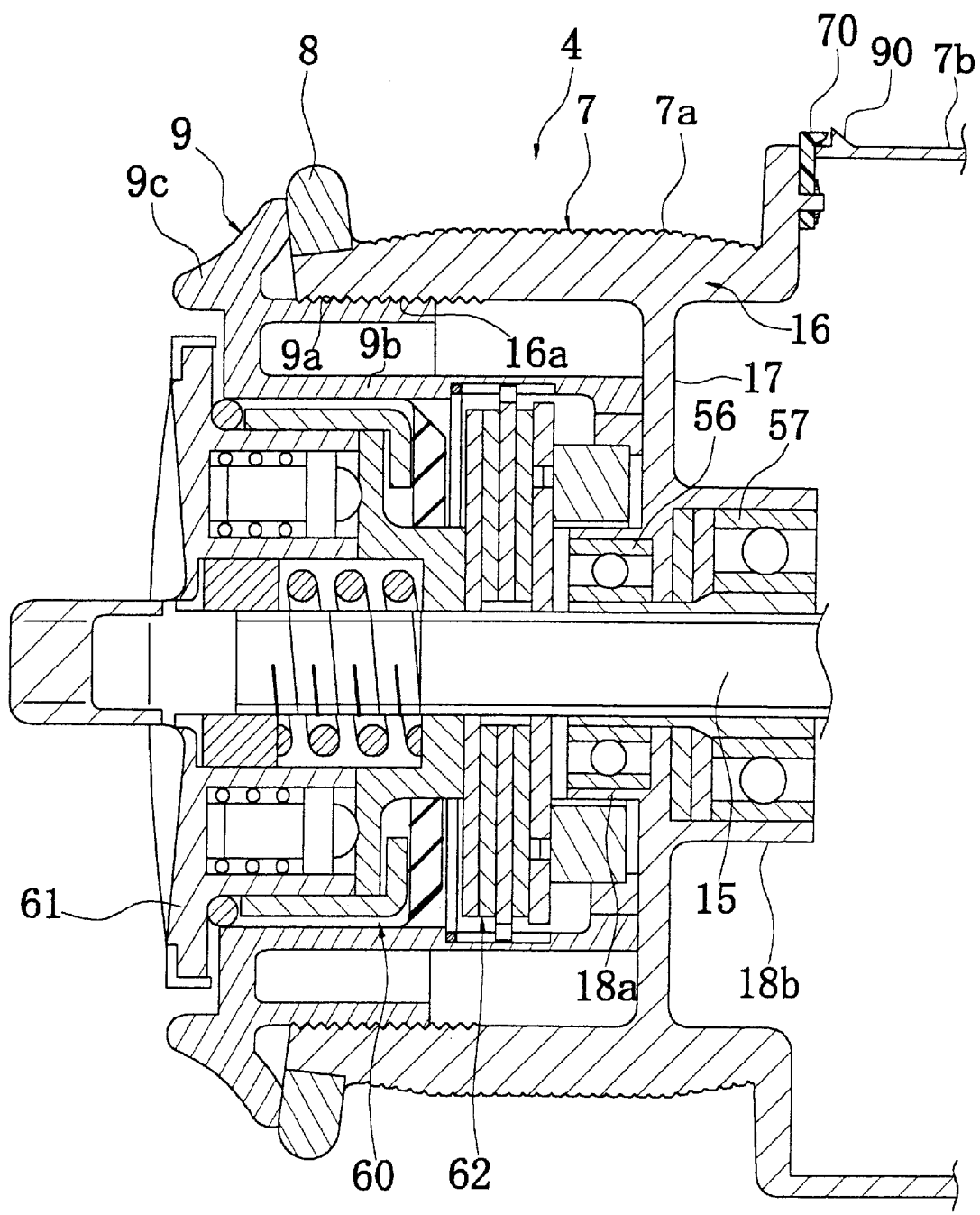
FIG. 3 is an enlarged fragmentary cross-sectional view of the spool of the spinning reel of FIG. 2.

The bobbin trunk 7a includes, as shown in FIG. 3, a tubular portion 16 a disk portion 17, and a pair of bosses 18a, 18b. The disk portion 17 formed integrally with the tubular portion 16 on the inner circumferential side thereof. The pair of bosses 18a, 18b is formed on an inner circular margin of the disk portion 17. A female-threaded portion 16a for attaching the flange-fastening member 9 is formed in the inner circumferential surface of the tubular portion 16. The bearings 56, 57 are fitted into the inner periphery of the bosses 18a, 18b.

Figure 4:
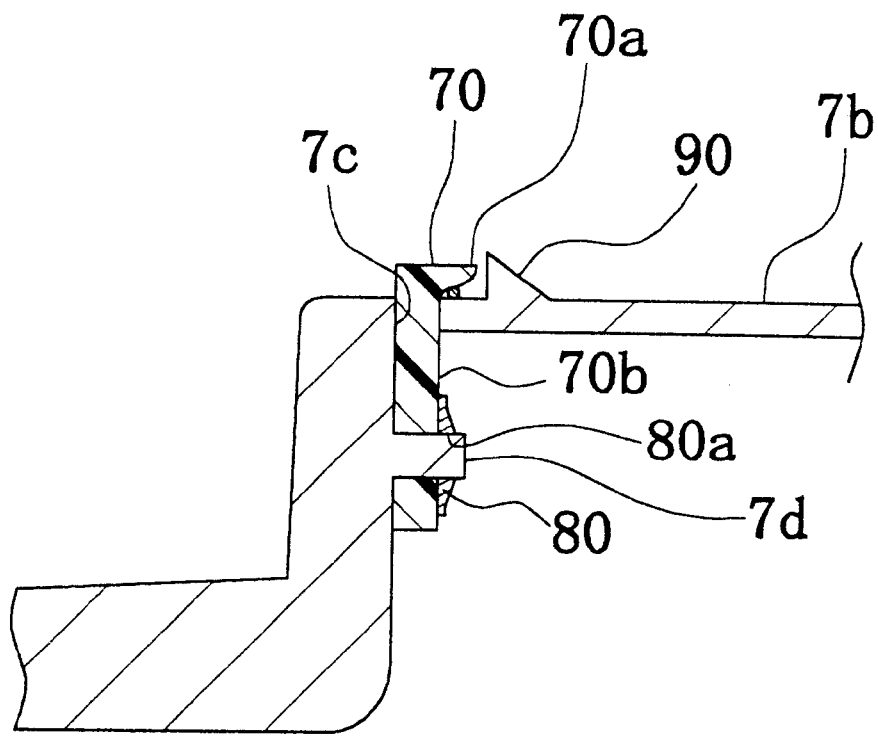
FIG. 4 is an enlarged fragmentary cross-sectional view of a fishing-line lock and environs of the spinning reel of FIG. 2.

The skirt 7b is stamp-forged integrally with the bobbin trunk 7a into a tubular form to cover the cylindrical portion 30 of the rotor 3. Further, as shown in FIG. 4, a through-hole 7c, into which a fishing-line lock 70 is mountable, is formed penetrating the skirt 7b in its outer circumferential front end. A locking pin 7d projecting rearward is formed on the inner peripheral side of the skirt 7b front end. Further, to the rear of the fishing-line lock 70 on the skirt 7b outer periphery, a fishing-line entry blocker 90 protruding more radially outward than the fishing-line lock 70 is formed integrally with the skirt 7b.

The fishing-line lock 70, as shown enlarged in FIG. 4, is preferably manufactured of a synthetic resin, for example, and made such that engagement of the fishing line is released under the tension acting over the line roller 41 when the fishing line is reeled out. The fishing-line lock 70 includes a lock portion 70a and a mount portion 70b. The lock portion 70a is provided radially outward of the skirt 7b. The lock portion 70a faces the outer periphery of the skirt 7b. The mount portion 70b is folded at approximately a right angle from the lock portion 70a. The mount portion 70b penetrates the through-hole 7c and extends into the skirt 7b interior.

Figure 5:
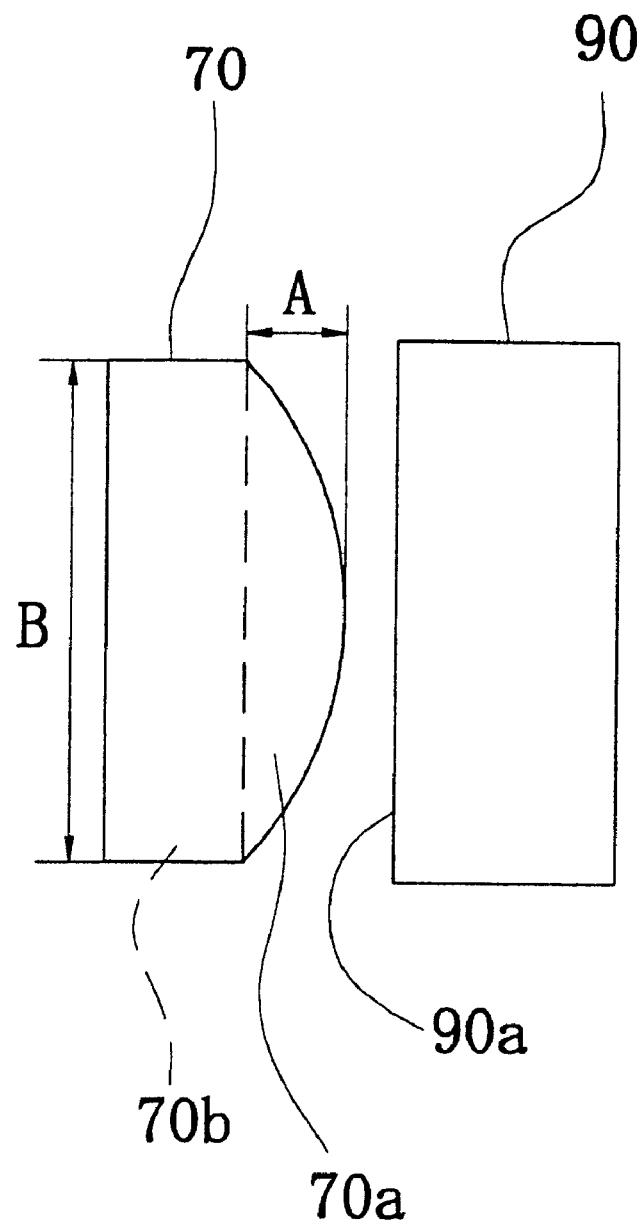
FIG. 5 is a enlarged plan view of a fishing-line lock and environs of the spinning reel of FIG. 1.

The lock portion 70a pinches fishing line against the outer circumferential face of the skirt 7b. The lock portion 70a, as shown in FIG. 4, is shaped to give the leading end a rounded aspect. Further, the thickness of the locking area (the distance between the lower-end surface of the lock portion 70a and the skirt 7b outer circumferential surface) is made narrow. As shown in FIG. 5, the shape of the lock portion 70a is formed to be approximately hemispherical or tetra-spherical in contour in this embodiment. Moreover, the lock portion 70a is formed so that its length A in the front-to-rear direction is shorter than the length B of the lock portion 70a in the circumferential direction. Therefore, fishing line can readily be unlocked with little force when the line is locked in the lock portion 70a. In the situation, for example, in which an angling technique like locking the mid-part of the fishing line is used, when a fish strikes, discharging fishing line over the line roller 41, the fishing line comes undone from the lock portion 70a without the angler releasing the fishing line from its engagement in the lock portion 70a, which particularly suits the situation better than conventional locks.

A mounting hole into which the locking pin 7d inserts, as shown in FIG. 4, is formed in the mount portion 70b, which abuts on the front end of the skirt 7b. In attaching the mount portion 70b to the skirt 7b, the pin 7d is inserted into the mounting hole and fastened by fitting a lock fitting 80 onto the locking pin 7d head jutting from the mount portion 70b. The lock fitting 80 is, for example, a disk-shaped part preferably made of metal and having a hole 80a through the center. The hole 80a is formed to be smaller in diameter than the diameter of the locking pin 7d. Slits are formed in four places on the inner margin of the hole 80a. When the locking pin 7d is pressed into the hole 80a, the inner margin spreads out in a clamping orientation and clasps the locking pin 7d, thereby fastening the lock fitting 80 onto it.

Figure 6:
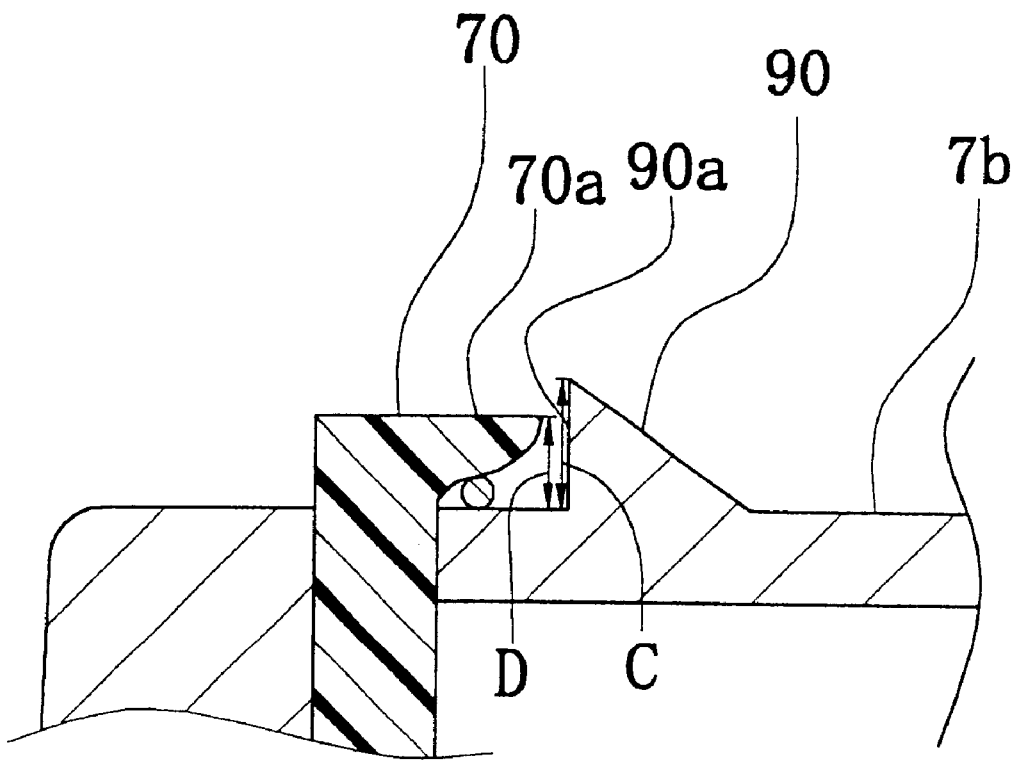
FIG. 6 is a enlarged fragmentary cross-sectional view of a fishing-line entry blocker and environs of the spinning reel of FIG. 2.

The fishing-line entry blocker 90 is a component for preventing fishing line in the fishing-line lock 70 from entering. The fishing-line entry blocker 90 is formed integrally with, and protrudes from the skirt 7b. The blocker 90 includes, as shown enlarged in FIG. 6, a step 90a that produces a wall face opposing the opening area of the lock portion 70a. The fishing-line entry blocker 90 is arranged to project radially outward more than the fishing-line lock 70. In other words, an amount C by which the fishing-line entry blocker 90 projects outward is larger than an amount D by which the fishing-line lock 70 projects outward. Thus, the fishing line is not apt to enter inadvertently the fishing-line lock 70.

As shown in FIG. 3, the flange 8 is a circular plate component made preferably of metal or manufactured from a hard, scratch-resistant ceramic, and is formed so as to incline forward, i.e. away from the reel unit 2, going radially outward. The flange 8 is fastened between the bobbin trunk 7a and the flange-fastening member 9. The flange-fastening member 9 screws into the female-threaded portion 16a in the inner circumferential surface of the bobbin trunk 7a to clamp the flange 8.

The flange-fastening member 9 includes a tubular male-threaded portion 9a, a tubular drag-housing portion 9b, and an abutment portion 9c. The tubular male-threaded portion 9a screws into the female-threaded portion 16a formed in the inner circumferential surface of the spool body. The tubular drag-housing portion 9b is formed integrally with and to the inner circumferential side of the male-threaded portion 9a. The tubular drag-housing portion 9b has a space in the interior for housing a plurality of drag plates 62 of the drag mechanism, described later. The abut portion 9c is provided on the fore end of the male-threaded portion for abutting the flange 8.

The drag mechanism 60 applies drag force on the spool 4. The drag mechanism 60 is fitted in between the spool 4 and the spool shaft 15, as shown in FIG. 3. The drag mechanism 60 includes a knob 61 for manually adjusting the drag force, and multi-sheet drag plates 62, which are compressed toward the spool 4 by the knob 61.

The aforementioned configuration of the spool 4 with the fishing-line lock 70 allows fishing line to be released under tension acting over the line roller 41 when the fishing line is reeled out. Therefore, particularly in situations in which the angling technique of locking the mid-part of the fishing line is used, the fishing line will come undone automatically from the fishing-line lock 70 under tension acting over the line roller 41 when the fishing line is reeled out. Accordingly, establishing a fishing-line lock 70 as described thereby provides a spool with locking and unlocking advantages relative to the mid-part of fishing line when compared to conventional lines locks.

Other Embodiments

Alternative embodiments will now be presented. In view of the similarities between the aforementioned embodiment and the alternate embodiments, components or parts of the alternate embodiments having the same function as those of the aforementioned embodiment are being given identical reference numerals. Moreover, the explanations of components or parts and their operation of the alternate embodiments that are similar to that of the aforementioned embodiment will be omitted. Components and operations that differ from the aforementioned embodiment will be explained.

(a) The fishing-line lock 70 in the foregoing embodiment is preferably manufactured of synthetic resin, but is not thereby limited, and may be manufactured of metal. Further, the shape of the lock portion 70a is not limited to the shape lending the leading end a rounded aspect.

Figure 11:
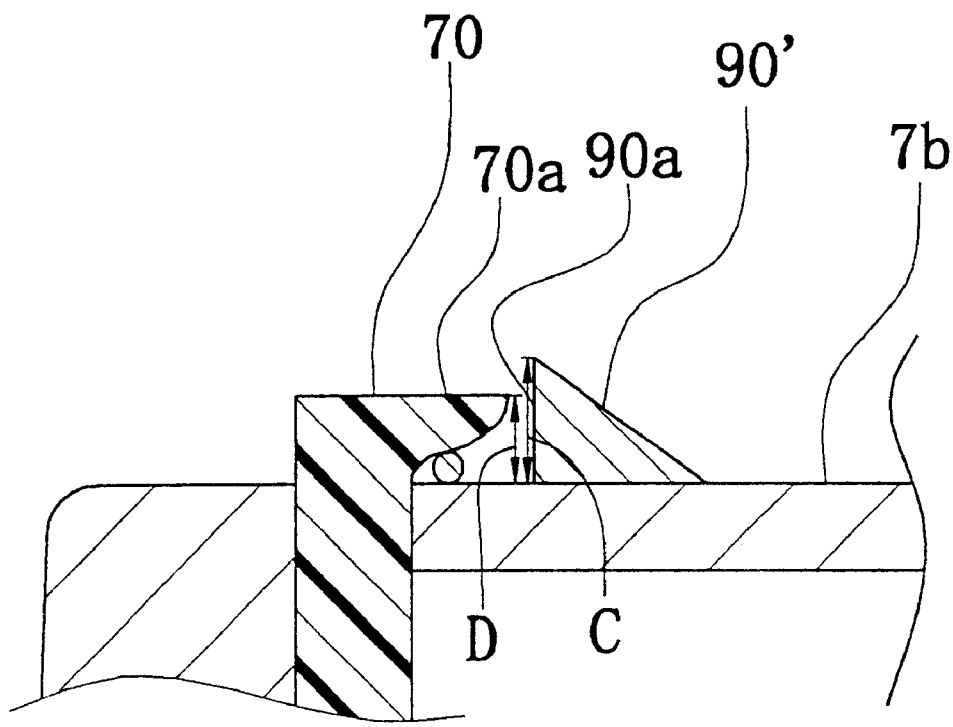
FIG. 11 is a view corresponding to FIG. 4 in accordance with a fifth alternate embodiment of the present invention.

(b) In the foregoing embodiments, the fishing-line entry blocker 90 is formed integrally with the skirt 7b, but each may be formed as a separate entity. As seen in FIG. 11, the fishing-line entry blocker 90' is formed as a separate entity.

Figure 7:
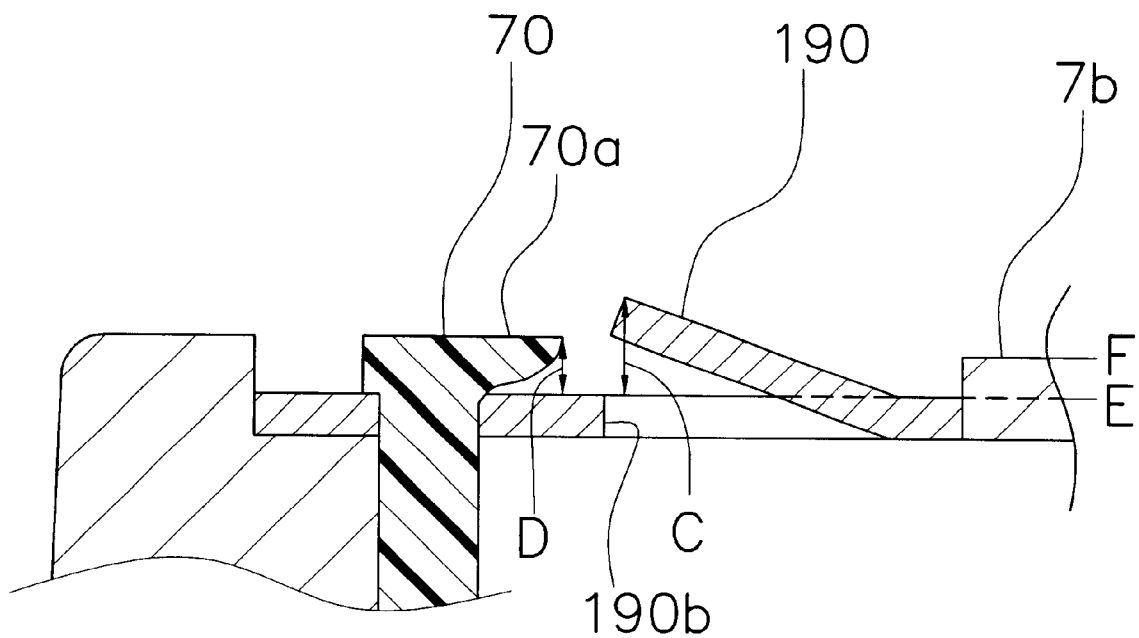
FIG. 7 is a view corresponding to FIG. 4, in accordance with an alternate embodiment of the present invention.

(c) As shown in FIG. 7, a fishing-line entry blocker 190 may be a plate-like member, such as a spring component. The fishing-line entry blocker 190 extends from and is stowable with respect to a sheet material having a recess 190b, installed in a grooved section formed in the skirt 7b. The plate-like member for the fishing-line entry blocker 190 is mounted to let one end pivot, and having the other end of the plate-like member open from and close onto the skirt. When the plate-like member is opened, an amount C by which the fishing-line entry blocker 190 projects outward is larger than an amount D by which the fishing-line lock 70 projects. Thus, the fishing line is not liable to enter inadvertently the fishing-line lock 70. Further, an upper surface E of the fishing-line entry blocker 190 when the plate-like member is closed, i.e., when housed, becomes flush with an outer peripheral face F of the skirt 7b, or positioned inner-marginally from the outer peripheral face F. With a fishing-line lock 70 as described, when the fishing line is to be engaged in the fishing-line lock 70, closing the fishing-line entry blocker 190 houses it compactly, while, opening the fishing-line entry blocker 190 will block fishing line entry.

Figure 8:
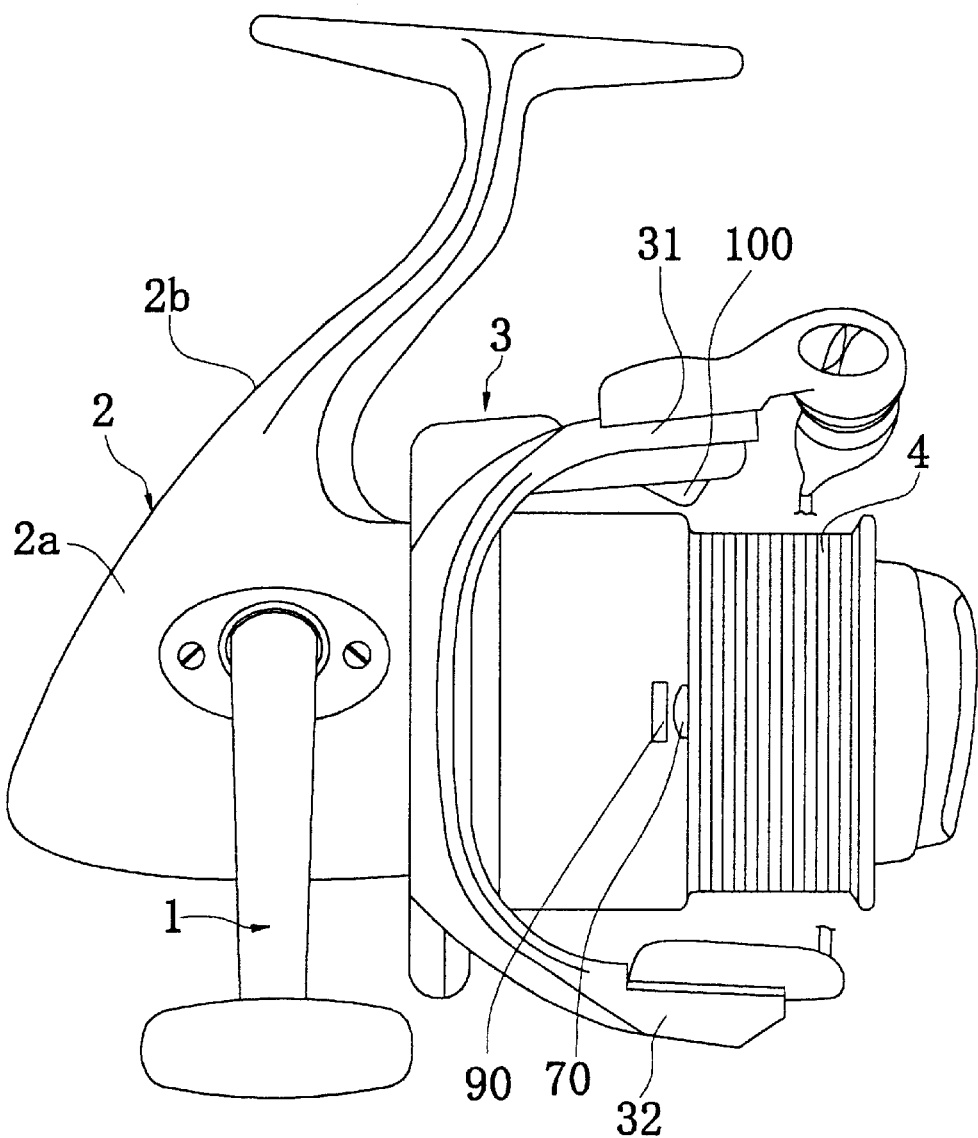
FIG. 8 is a view corresponding to FIG. 1, in accordance with a second alternate embodiment of the present invention.

(d) As shown in FIG. 8, a protrusion 100 for catching the fishing line may be further provided, between the fishing-line lock 70 and the line roller 41, on the upstream side, in the line-retrieving direction, of the line-roller 41 supporting first rotor arm 31. In FIG. 8, a protrusion 100 that catches the fishing line when the fishing line reels out over the line roller 41 is formed on the first rotor arm 31. The protrusion 100 is provided protruding on the underside of the first rotor arm 31, and is shaped to have a curved contour for smoothly guiding the fishing line. In this case, the fishing line catching on the protrusion when the drag is in operation softens the retrieve angle toward the line roller 41 of the fishing-line in the fishing-line lock 70. Thus, the engaged fishing line can come undone easily from the fishing-line lock 70. In particular, spinning reels whose spool 4 stroke is long are apt to make the retrieve angle toward the line roller 41 of the fishing-line in the fishing-line lock 70 acute. Therefore, providing the protrusion makes the engaged fishing line come undone more easily from the fishing-line lock 70.

Configuring the spinning reel this way allows fishing line under tension acting over the line roller 41 when the fishing line is reeled out to be released from the fishing-line lock 70. Therefore, particularly in situations in which the angling technique of locking the mid-part of the fishing line is used, under the tension acting over the line roller 41 when the fishing line is reeled out, the fishing line will disengage automatically from the fishing-line lock 70. Moreover, since the protrusion 100, which catches the fishing line when the fishing line is reeled out over the line roller 41, is formed in the first rotor arm 31, the angle the fishing line assumes is not liable to become an acute angle. Thus, providing the protrusion 100 allows the fishing line to disengage automatically from the fishing-line lock 70.

Figure 9:
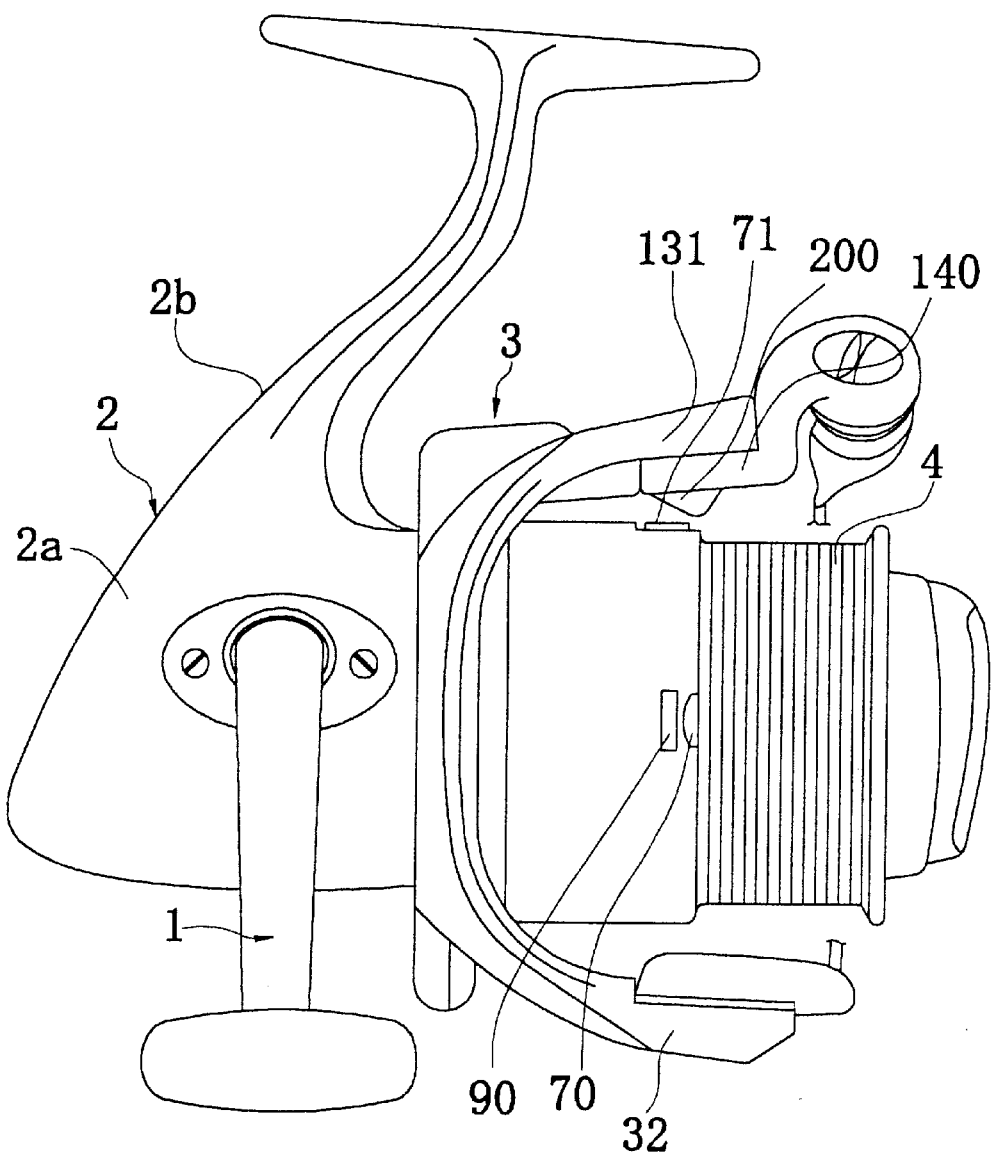
FIG. 9 is a view corresponding to FIG. 1, in accordance with a third alternate embodiment of the present invention.

(e) In the foregoing embodiment, the protrusion 100 is provided protruding on the underside of the first rotor arm 31, but a protrusion 200 may be provided on the underside of the first bail-support member 140, as shown in FIG. 9. In this case, the first bail-support member 140 is pivotally mounted on the inner peripheral side of the lead end of the first rotor arm 131.

(f) The spinning reel in the foregoing embodiment is a front-drag type, but is not thereby limited; the spinning reel may be a rear-drag type. Further, other than to the above-described spool-braked spinning reel, in which the spool rotates when the fishing line reels out over the line roller, the present invention can also be applied to a rotor-braked spinning reel, in which the rotor rotates when the fishing line reels out. Applicability would not be limited to rotor-braked models that are braked with a lever.

Figure 10:
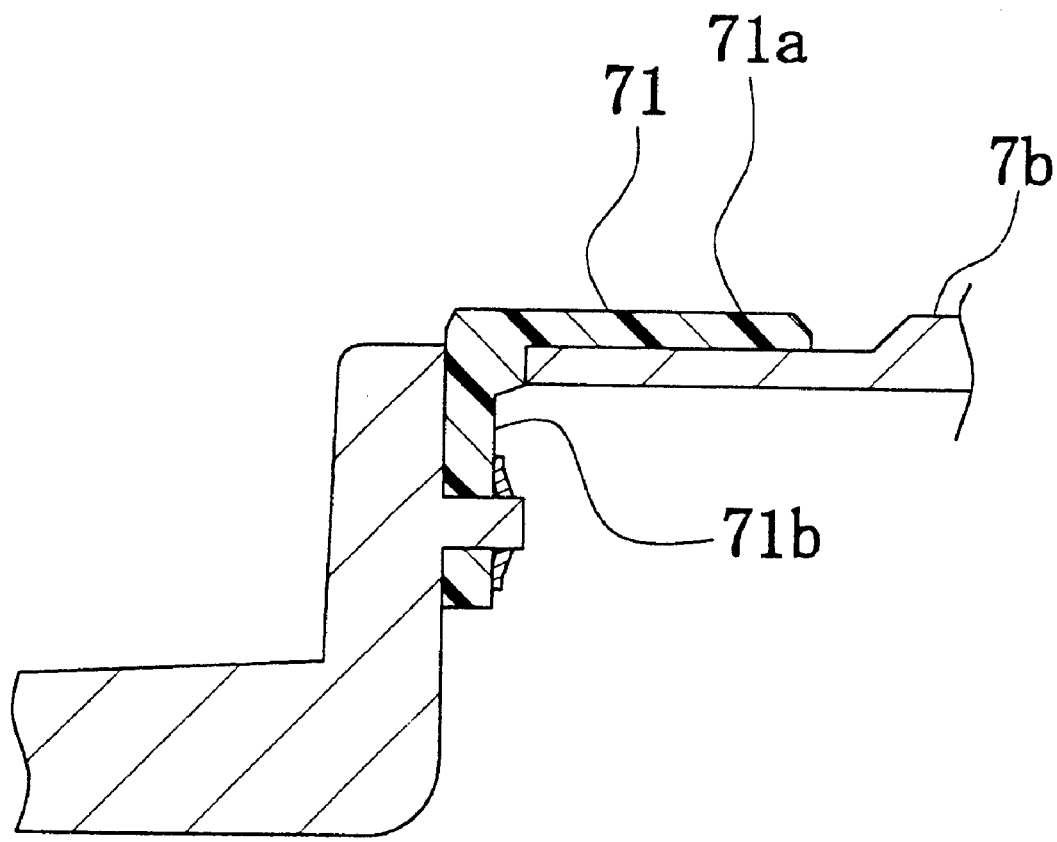
FIG. 10 is a view corresponding to FIG. 4 in accordance with a fourth alternate embodiment of the present invention.

(g) As shown in FIG. 9 and FIG. 10, an auxiliary fishing-line lock 71 is provided. The auxiliary fishing-line lock 71 has a lock portion for locking the leading-end part of the fishing line. A mount portion 71*b* may be further furnished where the fishing-line entry blocker 90 does not operate. The locking force of the fishing-line lock 70 is weaker than the locking force of the auxiliary fishing-line lock 71.

Constituted through the present invention is a fishing-line lock that under tension acting over the line roller when the fishing line is reel out releases the engagement of the fishing line. A spool that is more convenient for locking and unlocking the mid-part of fishing line is thereby provided.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning-reel spool that reciprocates with respect to a reel body, and fishing line being wound onto said spinning reel spool via a line roller by a rotor rotation, said spinning-reel spool comprising:
   a bobbin trunk portion being arranged on an outer circumference of said spool, and onto which the fishing line is wound;
   a skirt portion being provided on said bobbin trunk; and
   a fishing-line lock on an outer periphery of said skirt portion and configured to lock the fishing line between said fishing-line lock and said outer periphery of said skirt portion, and release the fishing line under tension acting over the line roller when the fishing line is reeled out, said fishing-line lock having a longitudinal length that is shorter than its circumferential length.

2. The spinning-reel spool as set forth in claim 1, wherein said fishing-line lock has an end formed in an approximately round arcuate shape.

3. The spinning-reel spool as set forth in claim 1, further comprising
   a fishing-line entry blocker for preventing the fishing line from entering said fishing-line lock.

4. The spinning-reel spool as set forth in claim 3, wherein said fishing-line entry blocker is provided between said fishing-line lock and the reel body and adjacent said fishing-line lock.

5. The spinning-reel spool as set forth in claim 3, wherein said fishing-line entry blocker projects more radially outward than said fishing-line lock.

6. The spinning-reel spool as set forth in claim 3, wherein said fishing-line entry blocker is formed integrally with said skirt portion.

7. The spinning-reel spool as set forth in claim 3, wherein said fishing-line entry blocker is formed as a separate entity from said skirt portion.

8. The spinning-reel spool as set forth in claim 3, wherein said fishing-line entry blocker includes a step portion opposing said fishing-line lock.

9. The spinning-reel spool as set forth in claim 3, wherein said fishing-line entry blocker is a plate-shaped component.

10. The spinning-reel spool as set forth in claim 9, wherein said fishing-line entry blocker shifts with respect to said skirt portion.

11. The spinning-reel spool set forth in claim 10, wherein said fishing-line entry blocker moves to be flush with said skirt portion outer radially, or housed to position it inner-marginally from the outer circumferential surface.

12. The spinning-reel spool as set forth in claim 1, further comprising
an auxiliary fishing-line lock in said skirt portion outer circumferentially for locking the fishing line in its leading end part.

13. The spinning-reel spool as set forth in claim 12, wherein
said fishing-line lock is formed so that a locking force by said fishing-line lock is weaker than a locking force by said auxiliary fishing-line lock.

14. A spinning reel that attaches to a fishing rod and enables fishing line to be reeled out and retrieved, the spinning reel comprising:
a reel body arranged to attach to the fishing rod;
a spool having a bobbin trunk moving with respect to said reel body, said spool being provided on an outer circumference onto which fishing line winds, and a skirt portion being provided on said bobbin trunk;
a rotor rotatively attached to in said reel body to rotate relative to said spool when the fishing line is reeled out, and having a rotor arm disposed about an outer circumference of said spool and a bail arm mounted on said rotor arm and provided with a line roller to guide the fishing line, to wind the fishing line onto said bobbin trunk; and
a fishing-line lock provided on an outer periphery of said skirt portion and configured to lock the fishing line between said fishing-line lock and said outer periphery of said skirt portion, and release the fishing line under tension acting over the line roller when the fishing line is reeled out, said fishing-line lock having a longitudinal length that is shorter than its circumferential length.

15. A spinning reel that attaches to a fishing rod and enables fishing line to be reeled out and retrieved, the spinning reel comprising:
a reel body arranged to attach to the fishing rod;
a spool having a bobbin trunk moving with respect to said reel body, said spool being provided on an outer circumference onto which fishing line winds, and a skirt being provided on said bobbin trunk;
a rotor rotatively attached to in said reel body to rotate relative to said spool when the fishing line is reeled out, and having a rotor arm disposed about an outer circumference of said spool and a bail arm mounted on said rotor arm and provided with a line roller to guide the fishing line, to wind the fishing line onto said bobbin trunk;
a fishing-line lock being provided on an outer periphery of said skirt portion, to lock locking the fishing line, and to release the fishing line under tension acting over the line roller when the fishing line is reeled out; and
a protrusion disposed between said line roller and said fishing-line lock, and said protrusion provided on said rotor so as to catch the fishing line when the fishing line reels out over said line roller.

16. The spinning reel as set forth in claim 15, wherein said protrusion is provided on said rotor arm.

17. The spinning reel as set forth in claim 15, wherein said protrusion is provided on said bail arm.

18. The spinning reel as set forth in claim 15, wherein said spool rotates when the fishing line reels out over said line roller.

19. The spinning reel as set forth in claim 15, wherein said rotor rotates when the fishing line reels out over said line roller.

* * * * *